(12) United States Patent
Esteghlal

(10) Patent No.: US 12,334,810 B2
(45) Date of Patent: Jun. 17, 2025

(54) CONTROLLER FOR A DC-TO-DC CONVERTER, DC-TO-DC CONVERTER DEVICE, AND METHOD FOR ACTUATING A DC-TO-DC CONVERTER

(71) Applicant: Robert Bosch GmbH, Stuttgart (DE)

(72) Inventor: Gholamabas Esteghlal, Stuttgart-Weilimdorf (DE)

(73) Assignee: Robert Bosch GmbH, Stuttgart (DE)

( * ) Notice: Subject to any disclaimer, the term of this patent is extended or adjusted under 35 U.S.C. 154(b) by 187 days.

(21) Appl. No.: 18/254,111

(22) PCT Filed: Oct. 6, 2021

(86) PCT No.: PCT/EP2021/077571
§ 371 (c)(1),
(2) Date: May 23, 2023

(87) PCT Pub. No.: WO2022/117246
PCT Pub. Date: Jun. 9, 2022

(65) Prior Publication Data
US 2024/0006983 A1    Jan. 4, 2024

(30) Foreign Application Priority Data
Dec. 1, 2020 (DE) .................... 10 2020 215 123.7

(51) Int. Cl.
*H02M 1/00* (2007.01)
*H02M 1/088* (2006.01)
*H02M 3/335* (2006.01)

(52) U.S. Cl.
CPC .......... *H02M 1/088* (2013.01); *H02M 1/0009* (2021.05); *H02M 1/0025* (2021.05); *H02M 3/33523* (2013.01)

(58) Field of Classification Search
CPC .. H02M 1/088; H02M 1/0009; H02M 1/0025; H02M 3/33523
See application file for complete search history.

(56) References Cited

U.S. PATENT DOCUMENTS

| | | | |
|---|---|---|---|
| 10,180,446 B2 * | 1/2019 | Aldinger | G01R 15/183 |
| 2011/0116295 A1 * | 5/2011 | Ueda | H02M 5/297 363/163 |

(Continued)

FOREIGN PATENT DOCUMENTS

DE    19507084 A1    9/1996

OTHER PUBLICATIONS

Translation of International Search Report for Application No. PCT/EP2021/077571 dated Jan. 20, 2022 (2 pages).

(Continued)

*Primary Examiner* — Adolf D Berhane
*Assistant Examiner* — Afework S Demisse
(74) *Attorney, Agent, or Firm* — Michael Best & Friedrich LLP

(57) ABSTRACT

The invention relates to the verification of operating parameters, in particular input and output values of a DC-to-DC converter which are detected by a sensor. For this purpose, the ratio between the input current and the output current of a DC-to-DC converter is calculated on the basis of two different calculation methods, wherein the different calculation methods are at least partly based on different parameters. If the two calculation methods lead to the same or at least approximately the same ratio of input current to output current, a plausibility check can thus be run on the reliability of the parameters being used.

10 Claims, 2 Drawing Sheets

(56) References Cited

U.S. PATENT DOCUMENTS

2019/0245441 A1\* 8/2019 Stoeger ................ H02M 3/156
2020/0007027 A1 1/2020 Fujioka et al.

OTHER PUBLICATIONS

Li et al., "Fault Diagnosis and Fault-Tolerant Control of Photovoltaic Micro-Inverter," Journal of Central South University, 2016, vol. 23, No. 9, 12 pages.

\* cited by examiner

CONTROLLER FOR A DC-TO-DC CONVERTER, DC-TO-DC CONVERTER DEVICE, AND METHOD FOR ACTUATING A DC-TO-DC CONVERTER

BACKGROUND

The present invention relates to a control device for a DC-to-DC converter and a DC-to-DC converter device having such a control device. The present invention further relates to a method for actuating a DC-to-DC converter.

DC-to-DC converters are used in a variety of applications. For example, DC-to-DC converters can be used in order to transfer electrical energy from a high-voltage grid of an electrical vehicle to a low-voltage grid of the vehicle. Such DC-to-DC converters can comprise, for example, a control loop that carries out the actuation of the DC-to-DC converter using one or more specified target values as well as sensor-detected measured values. The reliability of the sensor-detected measured values is of essential importance.

For example, so-called flyback converters can be used as DC-to-DC converters. Publication DE 195 07 084 A1 discloses, for example, a flyback converter configured as a switching controller.

SUMMARY

The present invention creates a control device for a DC-to-DC converter, a DC-to-DC converter device, and a method for actuating a DC-to-DC converter.

Accordingly, the following is provided:

A control device for a DC-to-DC converter. The DC-to-DC converter serves to convert an input DC voltage into an output DC voltage. The control device is designed so as to calculate a first ratio between an input current and an output current of the DC-to-DC converter. The first ratio between input current and output current can in particular be calculated using a duty cycle employed for actuating the DC-to-DC converter. The control device is further designed so as to calculate a second ratio between the input current and the output current of the DC-to-DC converter. The second ratio between input current and output current can in particular be calculated using an input voltage and an output voltage of the DC-to-DC converter. Furthermore, the control device is designed so as to detect a malfunction. In particular, the malfunction can be a malfunction of a voltage and/or a current sensor that provides sensor values for actuating the DC-to-DC converter. However, other malfunctions are also possible, for example in the control loop of the control device. The malfunction can in particular then be detected if the calculated first ratio between input current and output current and the calculated second ratio between input current and output current differ from one another. In particular, a malfunction can be detected when the two ratios between input current and output current deviate by more than a specified threshold value.

The following is furthermore provided:

A DC-to-DC converter device having a DC-to-DC converter and a control device according to the invention for the DC-to-DC converter. The DC-to-DC converter is designed so as to convert an input DC voltage into a specified output DC voltage. The control device is in particular designed so as to determine a duty cycle for actuating the DC-to-DC converter and to actuate the DC-to-DC converter using the determined duty cycle. Accordingly, the DC-to-DC converter can be actuated, for example, with a pulse width-modulated actuation with a specified duty cycle.

Finally, the following is provided:

A method for actuating a DC-to-DC converter. The DC-to-DC converter for this method is designed so as to convert an input DC voltage into an output DC voltage. The method comprises a step of calculating a first ratio between an input current and an output current of the DC-to-DC converter. The first ratio between input current and output current can in particular be calculated using a duty cycle employed for actuating the DC-to-DC converter. The method further comprises a step of calculating a second ratio between the input current and the output current of the DC-to-DC converter. The second ratio between input current and output current can in particular be calculated using an input voltage and an output voltage of the DC-to-DC converter. Furthermore, the method comprises a step of detecting a malfunction. In particular, a malfunction can be detected if the calculated first ratio between input current and output current and the calculated second ratio between input current and output current of the DC-to-DC converter differ from one another. A malfunction can in particular be detected if the two ratios between input current and output current deviate by more than a specified target value.

The present invention is based on the finding that, for the operation of a DC-to-DC converter and in particular for a safe or reliable control of the output parameters of a DC-to-DC converter, the operating parameters, such as the electrical voltages at the input and/or output of the DC-to-DC converter, must be reliably known. In order to be able to reliably ensure the reliability of the determined measured values during operation, and in particular over the entire service life and, if necessary, in order to detect sensor errors early, the relevant measured values can be detected and verified by means of a plurality of redundant sensors. However, such a redundant design of the system is associated with higher cost and expense.

It is therefore an idea of the present invention to create a possibility to be able to ensure the reliability of the current and/or voltage values required for the control of a DC-to-DC converter, without redundant sensors to the extent possible. For this purpose, the present invention provides a determination of the correlations of the parameters required for controlling the DC-to-DC converter on the basis of two different calculation methods. Because different operating parameters are partly involved for the two different calculation methods, discrepancies in the sensor values can be detected very easily. If the different calculation methods result in a discrepancy, this indicates a malfunction of, for example, a sensor relevant for the control of the DC-to-DC converter. Thus, the reliability of the sensors employed can also be verified without the need for complex and costly redundant sensor systems.

Any suitable DC-to-DC converters are generally possible as the DC-to-DC converter for such a system. In particular, any DC-to-DC converter can be used whose control is based on a duty cycle of a pulse width-modulated actuation.

For example, the DC-to-DC converter can be a so-called flyback converter. The DC-to-DC converter can be a unidirectional DC-to-DC converter, which can convert an electrical DC voltage only in one direction into a further electrical DC voltage. Alternatively, bidirectional DC-to-DC converters are also possible, which can convert an electrical DC voltage in both directions between two different voltage levels.

To check the plausibility of the current and voltage values, a ratio between an input current and an output current is formed. However, it is understood that any other relationships can generally also be formed for checking the plausibility. In addition, it is also possible to calculate one or more specified current and/or voltage values for the DC-to-DC converter and to use these calculated values as the basis for the plausibility check. Variables, if also possible, to respectively calculate an individual current or voltage value on the basis of two different calculation instructions. Such values are directly correlated to the ratio between input current and output current and can thus be derived directly from this ratio.

According to one embodiment, the control device is designed so as to alternatively actuate the DC-to-DC converter in either a discontinuous conduction mode (DCM) or a continuous conduction mode (CCM). The control device can be designed so as to calculate the ratio between the input current and the output current, taking into account the current actuation mode for the DC-to-DC converter.

In particular, when calculating the ratio between input current and output current based on the duty cycle employed for controlling the DC-to-DC converter, different mathematical relationships arise depending on the operating mode. Accordingly, by considering of the operating mode of the DC-to-DC converter, the respectively suitable calculation scheme can be selected and applied.

According to one embodiment, the control device is designed so as to control the duty cycle for actuating the DC-to-DC converter using a specified target value for the output voltage and/or a specified target value for the output current. For example, a control loop can be implemented in the control device for the DC-to-DC converter, which controls the respective duty cycle for actuating the DC-to-DC converter using a specified target value on the basis of a sensor value for the output voltage and the output current, respectively. As a result, a duty cycle for actuating the DC-to-DC converter can be determined in order to set the desired target values at the output of the DC-to-DC converter. If an error occurs on a sensor for the corresponding output values of the DC-to-DC converter, and the sensor values are thus incorrect, this results in a duty cycle, which would lead to a discrepancy in the calculation of the ratio between the input current and the output current. From this discrepancy, a malfunction within the DC-to-DC converter or the sensors used for controlling the DC-to-DC converter can subsequently be assumed.

According to one embodiment, the control device is designed so as to output a signaling if a malfunction has been detected. This signaling can be an electronic signal, for example, which can be output to one or more further components. In this way, a malfunction can be signaled to a superordinate controlling instance, for example. Moreover, for example, an optical or audible signal can also be output in order to indicate the malfunction to a user. Furthermore, it is also possible to switch off the actuation of the DC-to-DC converter or the entire DC-to-DC converter when a malfunction is detected and, if necessary, to avoid dangerous operating conditions.

According to one embodiment, the DC-to-DC converter can comprise a flyback converter. In addition, any other suitable DC-to-DC converters are of course possible. In particular, the DC-to-DC converter can be a DC-to-DC converter whose control can be based on a pulse width-modulated signal.

According to one embodiment, the DC-to-DC converter can comprise a first current sensor designed so as to detect an input current of the DC-to-DC converter. The DC-to-DC converter can also comprise a first voltage sensor designed so as to detect an input voltage of the DC-to-DC converter. Furthermore, the DC-to-DC converter can comprise a second current sensor designed so as to detect an output current of the DC-to-DC converter. Finally, the DC-to-DC converter can also comprise a second voltage sensor designed so as to detect an output voltage of the DC-to-DC converter. Accordingly, the control device can be designed so as to check at least one of the sensor values using the first ratio between input current and output voltage. Because the current duty cycle used for actuating the DC-to-DC converter is involved in the calculation of the first ratio between the input current and the output current and this duty cycle is determined on the basis of a control loop, for example, it can be checked whether the duty cycle of the control loop matches the values provided by the sensors and thus also the second ratio between the input voltage and the output voltage.

The described configurations and further developments can be combined with one another as desired, where appropriate. Further configurations, developments, and implementations of the invention also include combinations of features of the invention described above or hereinafter not explicitly specified in the foregoing with respect to the exemplary embodiments. The skilled person in particular also add individual aspects as improvements or additions to the respective basic forms of the invention.

BRIEF DESCRIPTION OF THE DRAWINGS

Further features and advantages of the invention are explained hereinafter with reference to the drawings. Shown are.

DETAILED DESCRIPTION

Figure 1:
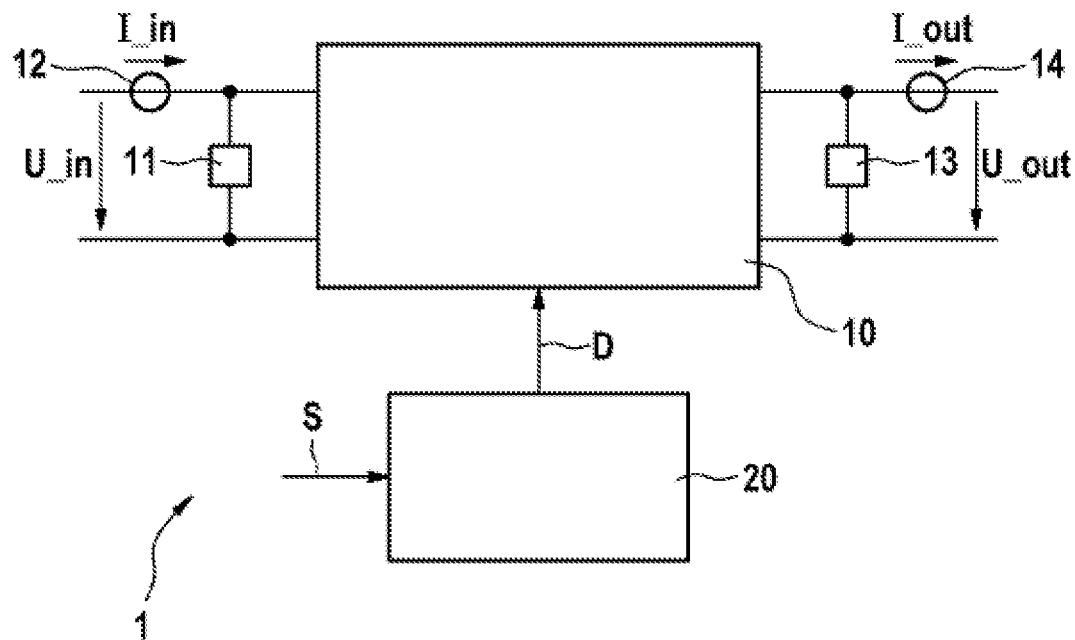
FIG. 1 is a schematic view of a block diagram of a DC-to-DC converter arrangement with a control device for a DC-to-DC converter according to one embodiment.

FIG. 1 shows a schematic view of a DC-to-DC converter arrangement 1 according to the invention. The DC-to-DC converter arrangement 1 comprises a DC-to-DC converter 10, which can be actuated by means of actuation signals from a control device 20. For example, an input DC voltage U_in can be provided at the input of the DC-to-DC converter 10. If electrical energy is transferred from the input side of the DC-to-DC converter 10 to an output side, then an electrical current I_in flows into the DC-to-DC converter 10. The DC-to-DC converter 10 converts the electrical DC voltage U_in supplied at the input into an electrical output DC voltage with the electrical voltage U_out. If electrical energy is transferred from the input side to the output side of the DC-to-DC converter 10, then an electrical current I_out flows out of the DC-to-DC converter 10 on the output side. For example, a current sensor 12 can be provided for the detection of the input current I_in into the DC-to-DC converter 10. The input voltage U_in can be monitored by means of a suitable voltage sensor 11, for example. Analogously, the output current I_out from the DC-to-DC converter 10 can be detected by means of a suitable current sensor 14, and the output voltage U_out can be monitored by means of a corresponding voltage sensor 13.

The sensor values detected by the sensors 11 to 14 can be provided on a control device 20. The control device 20 can then actuate the DC-to-DC converter 10 using the detected sensor values such that a specified target voltage is provided, for example, at the output of the DC-to-DC converter 10.

Alternatively, the output current I_out can also be set to a specified target value. For this purpose, one or more target values S can be provided on the control device 20, for example.

For example, by adjusting a duty cycle in a pulse width-modulated actuation of the DC-to-DC converter 10, the output of the DC-to-DC converter 10 can be set to the specified target values. For this purpose, a control loop can be provided in the control device 20, for example, which determines a corresponding duty cycle D using the specified target value S and one or more sensor values from voltage and/or current sensors 11 to 14.

Because there are high requirements for the reliability of the sensor values provided by voltage and current sensors 11 to 14 for such a control of the DC-to-DC converter 10, the sensor values may need to be at least partly checked for plausibility.

For this purpose, the control device can calculate relationships between input variables and output variables by means of several different methods, for example. If the different calculation methods are used as the basis for different variables and the different methods lead to the same or at least approximately the same values, then the underlying sensor values can be considered plausible. If, on the other hand, a significant deviation, for example a deviation by more than a specified threshold value, is determined in the calculation by means of different calculation methods, this can be indicative of an error within the control loop or with at least one of the voltage or current sensors 11 to 14.

If such an error is detected, a corresponding signaling can be output. Additionally or alternatively, the function of the DC-to-DC converter 10 can be limited, or the DC-to-DC converter can be completely deactivated, if necessary.

In order to check the plausibility of the sensor values provided by the current and voltage sensors 11 to 14, for example, in a first step, a correlation, for example a quotient, between the input current I_in and the output current I_out can be calculated, wherein in the first step this ratio is calculated using the currently set duty cycle D for actuating the DC-to-DC converter 10. The relationships to be established between the duty cycle D and the further sensor values can depend on the individual design of the DC-to-DC converter 10 and the currently set operating mode of the DC-to-DC converter 10. Specific examples of such a calculation will be detailed below.

In parallel, the ratio between input current I_in and output current I_out can also be calculated using the current input voltage U_in and the current output voltage U_out. For example, the current and voltage values of the respective current and voltage sensors 11-14 can be used for this purpose. For example, for a corresponding DC-to-DC converter, the ratio between input current I_in and output current I_out can be derived from the property that the quotient of input current and output current (I_in/I_out) is inversely proportional to the quotients of input voltage (U_in/U_out):

I_out/I_in=U_in/U_out

For example, the control device 20 can calculate the ratio of input current I_in and output current Iout, taking into account the currently set duty cycle D, and on the other hand it can calculate the ratio of input current I_in and output current Iout based on the input voltage U_in and the output voltage U_out. In particular, the calculation of this second ratio is performed without taking into account the currently set duty cycle in the DC-to-DC converter 10. If the two ratios of input current I_in and output current I_out are the same or at least approximately the same, this can be considered an indication of correct sensor values. If, on the other hand, the two ratios of input current I_in and output current I_out deviate significantly, that is to say by more than a specified threshold value, from one another, then a malfunction of the DC-to-DC converter 10 or at least one of the current and voltage sensors 11 to 14 can be assumed.

Figure 2:
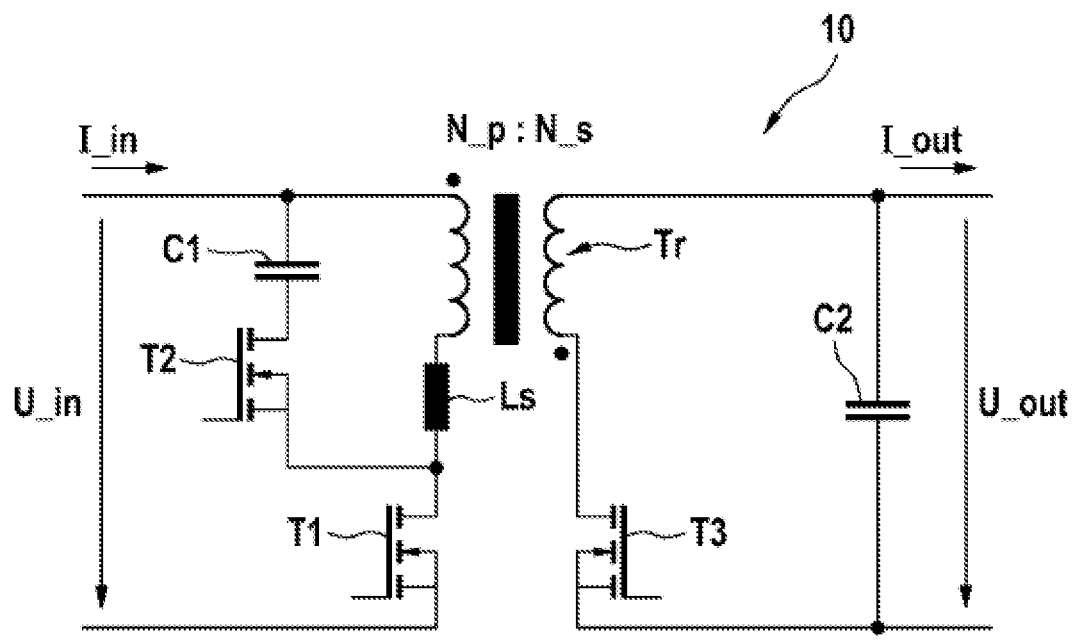
FIG. 2 is a schematic view of a block diagram of a flyback converter according to one embodiment.

FIG. 2 shows a schematic view of a block diagram of a flyback converter as can be used, for example, as a DC-to-DC converter 10 in the DC-to-DC converter arrangement 1 according to one embodiment. The DC-to-DC converter 10 in this exemplary embodiment comprises a transformer Tr. For example, this transformer can have a number of turns N_p on the primary side and a number of turns N_s on the secondary side. The leakage inductance of this transformer Tr is exemplified by the additional inductance Ls. The primary side of the transformer Tr is connected in series with a first switching element T1 on the input terminals of the DC-to-DC converter 10. Parallel to the primary-side terminals of the transformer Tr, a second switching element T2 is arranged in series with a first capacitor C1. The secondary side of the transformer Tr is connected in series with a third switching element T3 to the output terminals of the DC-to-DC converter 10. Parallel to this, a second capacitor C2 is provided. The detailed design as well as the principle operation and the actuation of such a flyback converter in the different operating modes is generally known and therefore will not be explained here in detail.

In a continuous conduction mode (CCM), the relationship between input current I_in and output current I_out is as follows:

$$\frac{I\_in}{I\_out} = \frac{D}{1-D} \cdot \frac{N\_s}{N\_p}$$

For a discontinuous conduction mode (DCM) of the flyback converter, on the other hand, the relationship between the input current I_in and the output current I_out is as follows:

$$\frac{I\_in}{I\_out} = \sqrt{\frac{R \cdot D^2}{2 \cdot L \cdot F}}$$

Here, L is the main inductance of the flyback converter, f is the switching frequency at which the flyback converter operates, and R is the Ohm losses of the flyback converter.

Thus, depending on the operating mode of such a flyback converter, a current ratio between input current I_in and output current Lout can be calculated from the duty cycle D and the known further properties of the flyback converter. This ratio can be compared to the ratio of input current I_in and output current Lout described above on the basis of the corresponding input voltage U_in and output voltage U_out, which has been calculated without the use of the duty cycle D.

Of course, analogous relationships can also be formed for other DC-to-DC converter arrangements, taking into account the respective properties of the actuation parameters, in particular a duty cycle for a pulse width-modulated actuation, in order to compare the ratio between the input current and the output current on the one hand based on the corresponding voltages and on the other hand based on the respectively set actuation parameters.

The plausibility of the sensor values means that a redundant design of the individual sensors can be omitted.

Figure 3:
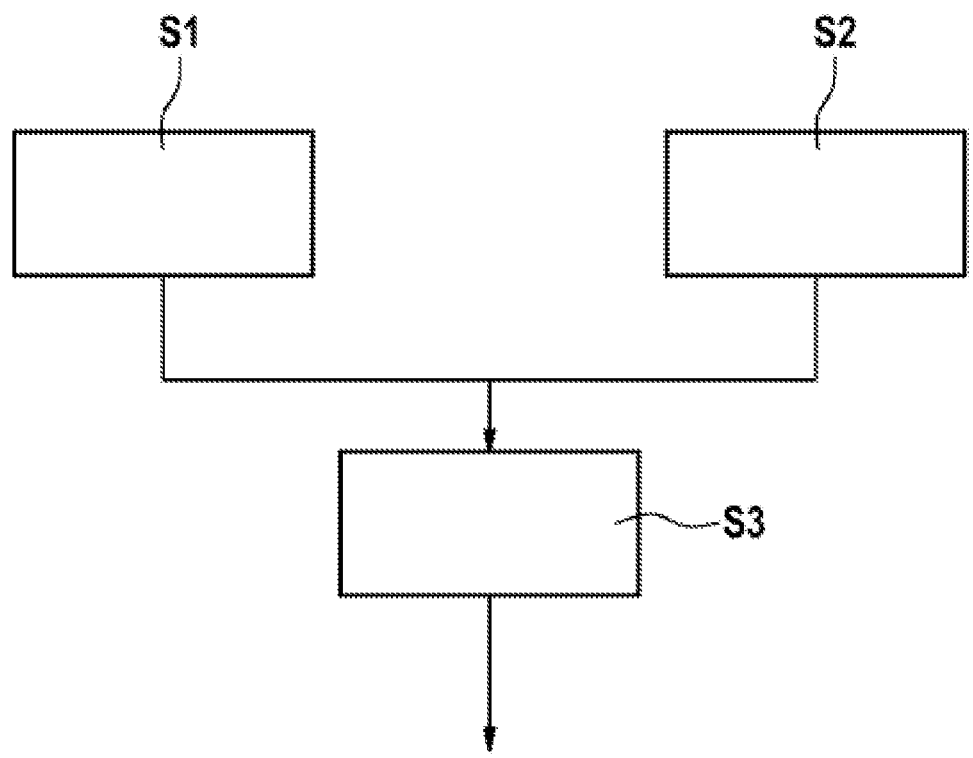
FIG. 3 is a flowchart as it underlies a method for actuating a DC-to-DC converter according to one embodiment.

FIG. 3 shows a flowchart as it underlies a method for actuating a DC-to-DC converter according to one embodiment. In principle, the method can comprise any of the steps previously described in connection with the DC-to-DC converter arrangement 1. Analogously, the DC-to-DC converter arrangement 1 described above, and in particular the control device 20, can also comprise any components required in order to implement the method described below.

In a step S1, a first ratio between input current I_in and output current I_out of the DC-to-DC converter 10 is calculated. This first ratio is in particular calculated using a control parameter required for actuating the DC-to-DC converter, for example a duty cycle D.

In step S2, a second ratio between input current I_in and output current I_out of the DC-to-DC converter 10 is calculated in parallel. This second ratio is in particular calculated using an input voltage U_in and an output voltage U_out of the DC-to-DC converter. As already mentioned above, the second ratio is calculated here without taking into account the duty cycle D.

A malfunction can then be detected in step S3 if the two calculated ratios deviate from one another. In particular, a malfunction can be detected if the two calculated ratios deviate by more than a specified threshold value.

The method for actuating the DC-to-DC converter 10 can in particular comprise a step for detecting the output voltage U_out of the DC-to-DC converter 10. Based on this detected voltage value of the output voltage U_out, an actuation parameter, for example a duty cycle D for a pulse width-modulated actuation of the DC-to-DC converter 10, can then be determined. In this way, a control loop for setting a specified target value for the output voltage U_out of the DC-to-DC converter 10 can be realized. Thus, the duty cycle D determined by this control loop can be used in order to determine the ratio between input current I_in and output current Lout of the DC-to-DC converter 10 for calculating the first ratio in step S1.

If a malfunction is detected in step S3, then the actuation of the DC-to-DC converter 10 can be stopped, for example. Alternatively, the actuation of the DC-to-DC converter 10 can also only be restricted, or only a signaling for a malfunction can be output to a further instance.

In summary, the present invention relates to plausibility check of operating parameters, in particular input and output values of a DC-to-DC converter which are detected by a sensor. For this purpose, the ratio between the input current and the output current of a DC-to-DC converter is calculated on the basis of two different calculation methods, wherein the different calculation methods are at least partly based on different parameters. If the two calculation methods lead to the same or at least approximately the same ratio of input current to output current, a plausibility check can thus be run on the reliability of the parameters being used.

The invention claimed is:

1. A control device (20) for a DC-to-DC converter (10) configured to convert an input DC voltage (U_in) and an output DC voltage (U_out), wherein the control device (20) is configured to:
   calculate a first ratio between an input current (I_in) and an output current (I_out) of the DC-to-DC converter (10) using a duty cycle (D) employed for actuating the DC-to-DC converter (10),
   calculate a second ratio between the input current (I_in) and the output current (I_out) of the DC-to-DC converter (10) using an input voltage (U_in) and an output voltage (U_out) of the DC-to-DC converter (10), and
   detect a malfunction if the calculated first ratio and the calculated second ratio between input current (I_in) and output current (I_out) of the DC-to-DC converter (10) deviate by more than a specified threshold value.

2. The control device (20) according to claim 1, wherein the control device (20) is configured to actuate the DC-to-DC converter (10) in either a discontinuous conduction mode or a continuous conduction mode, and
   wherein the control device (20) is configured to calculate the first ratio between input current (I_in) and output current (I_out), taking into account the current actuation mode for the DC-to-DC converter (10).

3. The control device (20) according to claim 1, wherein the control device (20) is configured to control the duty cycle for actuating the DC-to-DC converter (10) using a specified target value(S) for the output voltage (U_out) and/or the output current (I_out).

4. The control device (20) according to claim 1, wherein the control device (20) is configured to output a signaling if a malfunction has been detected.

5. A DC-to-DC converter device (1), comprising:
   a DC-to-DC converter (10) configured to convert an input DC voltage (U_in) into a specified output DC voltage (U_out); and
   a control device (20) according to claim 1,
   wherein the control device (20) is configured to determine a duty cycle (D) for actuating the DC-to-DC converter (10) and to actuate the DC-to-DC converter (10) using the determined duty cycle (D).

6. The DC-to-DC converter device (1) according to claim 5, wherein the DC-to-DC converter (10) comprises a flyback converter.

7. The DC-to-DC converter device (1) according to claim 6, with a first current sensor (12) configured to detect an input current (I_in) of the DC-to-DC converter (10),
   a first voltage sensor (11) configured to detect an input voltage (U_in) on the DC-to-DC converter (10),
   a second current sensor (14) configured to detect an output current (I_out) of the DC-to-DC converter (10), and
   a second voltage sensor (13) configured to detect an output voltage (U_out) on the DC-to-DC converter (10),
   wherein the control device (20) is configured to check at least one of the sensor values using the first ratio between input current (I_in) and output current (I_out).

8. A method for actuating a DC-to-DC converter (10) configured to convert an input DC voltage (U_in) and an output DC voltage (U_out), the method comprising the steps of:
   calculating (S1) a first ratio between an input current (I_in) and an output current (I_out) of the DC-to-DC converter (10) using a duty cycle (D) employed for actuating the DC-to-DC converter (10);
   calculating (S2) a second ratio between the input current (I_in) and the output current (I_out) of the DC-to-DC converter (10) using an input voltage (U_in) and an output voltage (U_out) of the DC-to-DC converter (10); and
   detecting (S3) a malfunction if the calculated first ratio and the calculated second ratio between input current (I_in) and output current (I_out) of the DC-to-DC converter (10) deviate by more than a specified threshold value.

9. The method according to claim 8, further comprising the steps of:

detecting an output voltage (U_out) of the DC-to-DC converter (10); and setting the duty cycle (D) for actuating the DC-to-DC converter (10) using the detected output voltage (U_out) and a specified target value(S) for the output voltage, wherein the first ratio between input current (I_in) and output current (I_out) of the DC-to-DC converter (10) is calculated using the set duty cycle (D) in a stationary control state.

10. The method according to claim 8, with a step for stopping the actuation of the DC-to-DC converter (10) if a malfunction has been detected.

\* \* \* \* \*